United States Patent [19]

Matthies et al.

[11] Patent Number: 4,818,793

[45] Date of Patent: Apr. 4, 1989

[54] IMPACT-RESISTANT NYLON MOLDING MATERIALS WHICH ARE LESS SUSCEPTIBLE TO STRESS CRACKING

[75] Inventors: Hans G. Matthies, Ludwigshafen; Horst Reimann, Worms, both of Fed. Rep. of Germany

[73] Assignee: BASF Aktiengesellschaft, Ludwigshafen, Fed. Rep. of Germany

[21] Appl. No.: 39,763

[22] Filed: Apr. 17, 1987

Related U.S. Application Data

[63] Continuation of Ser. No. 782,927, Oct. 2, 1985, abandoned.

[30] Foreign Application Priority Data

Oct. 4, 1984 [DE] Fed. Rep. of Germany ....... 3436362

[51] Int. Cl.$^4$ .............................................. C08L 77/06
[52] U.S. Cl. ...................................... 525/183; 525/179
[58] Field of Search ........................................ 525/183

[56] References Cited

U.S. PATENT DOCUMENTS

| | | | |
|---|---|---|---|
| 4,086,295 | 4/1978 | Mori et al. | 525/183 |
| 4,174,358 | 11/1979 | Epstein et al. | 525/183 |
| 4,246,371 | 1/1981 | Meyer et al. | 525/183 |
| 4,338,406 | 7/1982 | Sanderson et al. | 525/183 |
| 4,362,846 | 12/1982 | Korber et al. | 525/183 |
| 4,536,541 | 8/1985 | Latham | 525/183 |
| 4,554,320 | 11/1985 | Reimann et al. | 525/183 |

FOREIGN PATENT DOCUMENTS

| | | |
|---|---|---|
| 0070001 | 1/1983 | European Pat. Off. . |
| 0073036 | 3/1983 | European Pat. Off . |
| 58-201845 | 11/1983 | Japan . |
| 1575339 | 9/1980 | United Kingdom . |
| 1558800 | 9/1980 | United Kingdom . |

*Primary Examiner*—John C. Bleutge
*Assistant Examiner*—A. Carrillo
*Attorney, Agent, or Firm*—Keil & Weinkauf

[57] ABSTRACT

Impact-resistant nylon molding materials contain

A: a linear, thermoplastic nylon composed of radicals derived from terephthalic acid and isophthalic acid and alkanediamines of 4 to 10 carbon atoms, and B: from 50 to 60% by weight, based on A, of one or more copolymers of
  1. from 50 to 80% by weight of ethylene, from 20 to 50% by weight of a primary or secondary $C_2$–$C_8$-alkyl ester of (meth)acrylic acid, and from 0.5 to 10% by weight of a monomer possessing an acidic functional group or a latent acidic functional group, or
  2. from 70 to 98% by weight of a primary or secondary $C_2$–$C_8$-alkyl ester of (meth)acrylic acid, from 1 to 30% by weight of a monomer possessing an acidic functional group or a latent acidic functional group, and from 1 to 5% by weight of a monomer containing 2 or more olefinic double bonds in the molecule, the percentages stated in 1. and 2. summing to 100% in each case, and C: if required, effective amounts of additives.

2 Claims, No Drawings

IMPACT-RESISTANT NYLON MOLDING MATERIALS WHICH ARE LESS SUSCEPTIBLE TO STRESS CRACKING

This application is a continuation of application Ser. No. 782,927, filed on Oct. 2, 1985, now abandoned.

Moldings produced from nylon molding materials are sensitive to stress cracking, which is initiated by, for example, inorganic solutions and organic liquids, such as lower alcohols and zinc chloride solutions. Particularly susceptible in this respect are amorphous nylons. Thus, as disclosed in European patent application No. 70,001, attempts have been made to reduce the stress corrosion cracking of amorphous nylons based on isophthalic acid and terephthalic acid by adding partially crystalline nylons, such as nylon 6. However, this modifies the properties of the original nylon. Similarly, attempts have also been made to overcome stress corrosion cracking by means of ternary nylon blends, as described in German Laid-Open application DOS No. 2,651,741. An attempt was also made to apply the same principle, ie. the addition of partially crystalline nylons, to toughened nylons based on terephthalic acid and isophthalic acid (cf. European patent application No. 73,036). However, the results obtained in this case are unsatisfactory.

It is an object of the present invention to provide toughened nylons which are based on terephthalic acid and isophthalic acid, whose mechanical properties, such as impact resistance and flexural strength, have not been adversely affected, and which furthermore are less susceptible to stress cracking, in particular those which show no tendency to stress cracking.

We have found that this object is achieved by impact-resistant nylon molding materials containing A: a linear, thermoplastic nylon composed of radicals derived from terephthalic acid and isophthalic acid and alkanediamines of 4 to 10 carbon atoms, and
B: from 5 to 60% by weight, based on A, of one or more copolymers of
1. from 50 to 80% by weight of ethylene, from 20 to 50% by weight of a primary or secondary $C_2$-$C_8$-alkyl ester of (meth)acrylic acid, and from 0.5 to 10% by weight of a monomer possessing an acidic functional group or a latent acidic functional group, or
2. from 70 to 98% by weight of a primary or secondary $C_2$-$C_8$-alkyl ester of (meth)acrylic acid, from 1 to 30% by weight of a monomer possessing an acidic functional group or a latent acidic functional group, and from 1 to 5% by weight of a monomer containing 2 or more olefinic double bonds in the molecule, the percentages stated in 1. and 2. summing to 100% in each case, and
C. if required, effective amounts of additives.

The novel nylon molding materials are impact-resistant and possess a wide variety of excellent mechanical properties. Moreover, they are less susceptible to stress cracking and in particular show no tendency in this respect.

Nylons according to the invention (component A) are linear thermoplastic nylons composed of radicals derived from terephthalic acid and isophthalic acid and alkanediamines of 4 to 10, preferably 6 to 10, carbon atoms. In preferred nylons, the ratio of terephthalic acid radicals to isophthalic acid radicals is from 20:80 to 80:20, in particular from 30:70 to 70:30. Preferred diamines are straight-chain diamines, in particular $\alpha,\omega$-diamines. Hexamethylenediamine has become particularly important. Advantageously, the thermoplastic nylons have a relative viscosity of from 1.40 to 2.50, measured in 1% strength solution in concentrated sulfuric acid at 23°.

The novel copolymers B are used in an amount of from 5 to 60, in particular from 10 to 30, % by weight, based on the nylon A.

The novel copolymers 1 should be uncrosslinked, ie. they are advantageously not less than 90% soluble in hot solvents, such as toluene, ethyl benzene or tetrachloroethylene. They consist of from 50 to 80% by weight of ethylene, from 20 to 50, preferably from 25 to 38, in particular from 31 to 36, % by weight of a primary or secondary $C_2$-$C_8$-alkyl ester of (meth)acrylic acid, preferably n-butyl acrylate, and from 0.5 to 10% by weight of a monomer possessing an acidic functional group or a latent acidic functional group, for example monomers containing acidic groups, such as methacrylic acid or acrylic acid, or a monomer which possesses blocked acidic group and forms acidic groups under the compounding conditions or polymerization conditions, eg. maleic anhydride or tert.-butyl(meth)acrylate.

The preferred copolymers 1 have a melting range (melting point) of from 40° to 100° C. and a glass transition temperature below −20° C., in particular below −40° C. The copolymers 1 are in general high molecular weight compounds and have a melt flow index MFI 190/2.16 (DIN 53,735) of from 4 to 20. The copolymers are prepared in a conventional manner by polymerization of the components at elevated temperatures under a high ethylene pressure.

Furthermore, copolymers 2 which can be used according to the invention are those consisting of from 70 to 98, in particular from 90 to 98, % by weight of a primary or secondary $C_2$-$C_8$-alkyl ester of acrylic acid or methacrylic acid, preferably n-butyl acrylate, from 1 to 30, in particular from 1 to 20, % by weight of a monomer possessing an acidic functional group or a latent acidic functional group, for example monomers containing acidic groups, such as methacrylic acid or acrylic acid, or a monomer which possesses blocked acidic groups and forms acidic groups under the compounding conditions or polymerization conditions, eg. maleic anhydride or tert.-butyl meth(acrylate), and from 1 to 5, advantageously from 1 to 3, % by weight of a monomer containing 2 or more olefinic double bonds in the molecule, as a crosslinking agent. For example, bifunctional monomers, such as butanediol diacrylate or dicyclopentadienyl acrylate, are suitable.

The copolymers 2 advantageously have a glass transition temperature tg of below −10° C. Elastomeric polymers of this type are known per se and are prepared by emulsion polymerization of the abovementioned monomers. The technique of emulsion polymerization is described in detail in Houben-Weyl, Meth. d. org. Chemie, Volume XII, 1 (1961), pages 133–406.

Advantageously, the particle size of the copolymers B in the ready-prepared nylon molding materials is from 0.01 to 3 μm, in particular from 0.03 to 1 μm.

The novel nylon molding materials may additionally contain effective amounts of conventional additives C, examples of suitable additives being stabilizers and antioxidants, agents for inhibiting thermal decomposition and decomposition by ultraviolet light, lubricants, mold-release agents, colorants, such as dyes and pigments, and fibrous and pulverulent fillers and reinforcing agents. The stabilizers can be added to the materials at any stage of preparation. Preferably, they are added at an early stage in order to prevent decomposition beginning before the material can be protected. Such stabilizers should be compatible with the molding material.

Antioxidants and heat stabilizers which can be added to the thermoplastic materials according to the invention, include, for example, halides of metals of Group I of the Periodic Table, eg. sodium, potassium and lithium halides, and copper(I) halides, eg. iodides. Other suitable compounds are sterically hindered phenols or hydroquinones. As a rule, they are added in concentrations of not more than 1% by weight, based on the weight of the nylon.

The UV stabilizers used are those which are generally added to polymers, the amounts employed being not more than 2% by weight, based on the nylon. Examples of suitable UV stabilizers are various substituted resorcinols, salicylates, benzotriazoles and benzophenones.

Suitable lubricants and mold-release agents, which are added to the molding material in amounts of, for example, not more than 1% by weight, are stearic acid, stearyl alcohol and stearamides. Organic dyes, such as nigrosin, pigments, such as titanium dioxide or phthalocyanines, carbon black, fibrous and pulverulent fillers and reinforcing agents, such as carbon fibers, glass fibers, calcium silicate, aluminum silicate, magnesium carbonate, mica or feldspar, may also be added, for example in amounts of not more than 50% by weight, based on the molding material.

The molding materials according to the invention are usually compounded by mixing components A and B and, where relevant, C in conventional mixing apparatuses suitable for processing plastics, eg. extruders, at above the melting point of the nylon A, copolymer B being finely dispersed at the same time. The novel molding materials are useful for the production of shaped articles by injection molding and extrusion.

The Examples which follow illustrate the invention.

EXAMPLE 1

85 parts by weight of a nylon copolymer which is composed of terephthalic acid, isophthalic acid and hexamethylenediamine (the amount of terephthalic acid being 40 mol% and that of isophthalic acid 60 mol%) and has a relative viscosity of 1.91, measured on a 1% strength by weight solution in concentrated sulfuric acid at 23° C., 15 parts by weight of a terpolymer consisting of 67.5% by weight of ethylene, 32% by weight of n-butyl acrylate and 0.5% by weight of maleic anhydride and having a melt flow index of 14.5 g/10 min, measured at 190° C. and under a load of 2.16 kg, were mixed in a twin-screw extruder at 290° C. and extruded and granulated. The dry granules were injection-molded on an injection molding machine to give flat bars measuring 1.6×12.7×127 mm. To investigate the stress cracking behavior, flat bars conditioned under standard conditions of temperature and humidity (23° C., 50% relative humidity) were clamped in the form of an arc in a beaker so that they bent at an angle of 55°. One sample in each case was covered with one of the liquids listed in the Table below, stored for 4 weeks at room temperature and then examined for stress cracking. The results are shown in the Table below.

EXAMPLE 2

83 parts by weight of a nylon copolymer having the composition stated in Example 1 and a relative viscosity of 1.89 and 17 parts by weight of a terpolymer consisting of 98.5% by weight of n-butyl acrylate, 1% by weight of methacrylic acid and 0.5% by weight of dicyclopentadienyl acrylate, in the form of a 50% strength by weight aqueous dispersion, were mixed at from 230° to 290° C. in a twin-screw extruder possessing a devolatilization means, and were extruded and granulated. The dry granules were injection-molded as described in Example 1 to give flat bars, and these were stored for 4 weeks in various liquids, as described in Example 1. The results are shown in the Table below.

COMPARATIVE EXAMPLE 1

85 parts by weight of a nylon copolymer having the composition stated in Example 1 and a relative viscosity of 1.86 and 15 parts by weight of an EPDM rubber (ethylene-propylene-diene rubber containing about 30% of propylene) which consisted of about 30% by weight of propylene which was grafted to maleic acid as described in German Laid-Open Application No. DOS 2,622,973 were mixed at 290° C. in a twin-screw extruder, and were extruded and granulated. Flat bars were produced by injection molding and subjected to the stress corrosion cracking test, these steps being carried out as described in Example 1. The results are shown in the Table below. When methanol was poured over the sample, it caused the latter to fracture immediately. Acetone resulted in stress cracking after storage for 1 day, and this caused the surface to become dull.

COMPARATIVE EXAMPLE 2

A nylon copolymer having the composition stated in Example 1 was injection-molded in a similar manner to give flat bars, and these were tested with regard to stress corrosion cracking as described in Example 1. The results are shown in the Table below.

TABLE

| Example | Composition | Stress cracking after 4 weeks | | | Tensile strength according to DIN 53,455 NI mm$^2$ | Notched impact test according to DIN 53,453, at −40° C. kJ/m$^2$ |
| --- | --- | --- | --- | --- | --- | --- |
| | | Acetone | Methanol | 10% of ZnCl$_2$ | | |
| 1 | Nylon copolymer 6I/6T + 15% by weight of rubber (E—nBA—MSA 67.5:32:0.5) | None | None | None | 59 | 10 |
| 2 | Nylon copolymer 6I/6T + 15% by weight of rubber (nBA—meth- | None | None | None | 61 | 10 |

TABLE-continued

| Example | Composition | Stress cracking after 4 weeks | | | Tensile strength according to DIN 53,455 NI mm² | Notched impact test according to DIN 53,453, at −40° C. kJ/m² |
| --- | --- | --- | --- | --- | --- | --- |
| | | Acetone | Methanol | 10% of ZnCl₂ | | |
| | acrylic acid-crosslinking agent 98,5:1:0.5 | | | | | |
| Comparison 1 | Nylon copolymer 6I/6T + 15% by weight of EPDM rubber | Transverse cracks, surface dull | Fractures when poured over; surface dull | None | 55 | 9 |
| Comparison 2 | Nylon copolymer 6I/6T, no additive | Large number of transverse cracks, surface dull | Fractures when poured over | Transverse and Longitudinal cracks, brittle | 89 | 2 |

We claim:

1. An impact-resistant nylon molding material consisting essentially of
   A: a linear, thermoplastic, amorphous nylon composed essentially of radicals derived from terephthalic acid, isophthalic acid and alkanediamines of 4 to 20 carbon atoms, said amorphous nylon having a relative viscosity of from 1.4 to 2.5 measured in 1% strength sulfuric acid solution at 23° C., and
   B: from 5 to 60% by weight, based on A, of a copolymer of from 70 to 98% by weight of a primary or secondary $C_2$–$C_8$-alkyl ester of (meth)acrylic acid, from 1 to 30% by weight of a monomer possessing an acidic functional group or a latent acidic functional group selected from the group consisting of acrylic acid, methacrylic acid, maleic anhydride, tertiary butyl acrylate, tertiary butyl methacrylate and mixtures thereof, and from 1 to 5% by weight of a monomer containing 2 or more olefinic double bonds in the molecule selected from the group consisting of butanediol diacrylate and dicyclopentadienyl acrylate.

2. The molding material of claim 1, wherein B is a copolymer of n-butylacrylate, methacrylic acid and a monomer containing 2 or more olefinic double bonds in the molecule.

* * * * *